May 17, 1932.  B. A. WITTKUHNS  1,858,425
MEANS FOR POSITIONING REMOTE OBJECTS
Filed Oct. 11, 1930
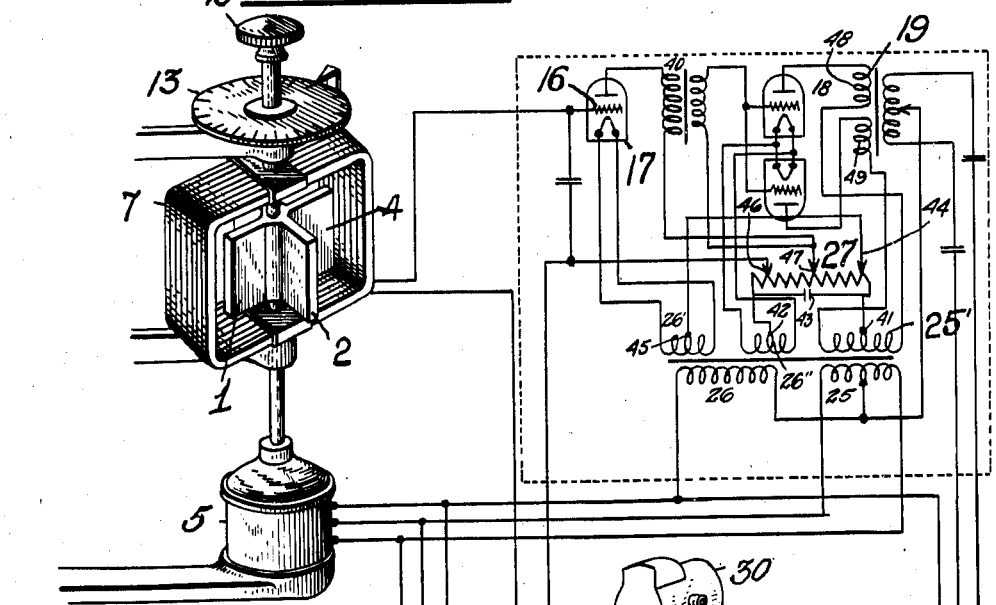
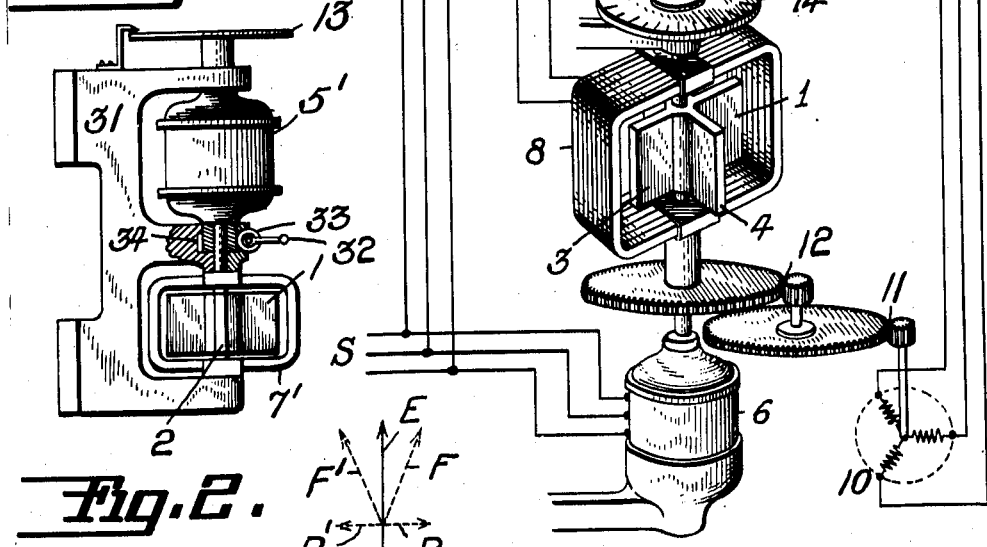
INVENTOR
Bruno A. Wittkuhns
BY
Herbert H. Thompson
his ATTORNEY.

Patented May 17, 1932

1,858,425

UNITED STATES PATENT OFFICE

BRUNO A. WITTKUHNS, OF CHATHAM, NEW JERSEY, ASSIGNOR TO SPERRY GYROSCOPE COMPANY, INC., OF BROOKLYN, NEW YORK, A CORPORATION OF NEW YORK

MEANS FOR POSITIONING REMOTE OBJECTS

Application filed October 11, 1930. Serial No. 488,051.

This invention relates to self-synchronous remote control or transmission systems, especially to systems which are adapted to exert appreciable torque on the controlled object. My system is of the alternating current type having a thermionic amplifier between the sending instrument and the receiving instrument by which a power motor is controlled as to torque and direction for turning the driven object. My system, therefore, is to be distinguished from the so-called Selsyn self-synchronous system which is unadapted for turning heavy objects unless an additional power motor is employed besides the transmitter and repeater motor.

Referring to the drawings,

Fig. 1 is a wiring diagram illustrating my invention as applied to the remote control of an object such as a searchlight.

Fig. 2 is a vector diagram of the E. M. F.'s generated in the sending and receiving coils.

Fig. 3 is a side elevation of a modified form of sending instrument.

According to my invention I continuously generate opposing A. C. potentials by the relative rotation of magnetic poles and windings. As shown I rotate one or more pole pieces or permanent magnets 1—2 at the sending instrument and similar permanent magnets 3—4 at the receiver. Both magnetic units are rotated continuously at the same speed, preferably by synchronous A. C. motors 5—6 driven from the polyphase supply S. Surrounding or in the magnetic field of the pole pieces of both sender and receiver are similar coils or windings 7—8. The two coils are shown as provided with suitable indicating dials 13—14 and the sending instrument is also provided with any suitable means for turning the same, such as the knob 15. A searchlight 30 is diagrammatically represented as turned from dial 14. As the pole pieces are rotated alternating potentials will be generated in both coils. Preferably the coils are connected in opposition so that when they are similarly placed with respect to the poles, the E. M. F's. generated will be equal and 180° out of phase as illustrated by the arrows E and E' in Fig. 2. If, however, coil 7 at the sending instrument is displaced slightly from said position (or the relation between the revolving poles on the sender and receiver are disturbed), the phase of the generated E. M. F's will be displaced to the right or left, depending on the direction of the displacement of the coil as illustrated by the dotted arrows F and F' of Fig. 2. This will give rise to a definite unbalanced potential P or P'. I make sure of this unbalanced potential to operate a servo motor 10 at the receiver which is shown as geared through reduction gearing 11—12 to rotate the coil 8 so as to bring it into parallelism with coil 7.

For actuating the servo motor upon minute changes in the position between the sending and receiving instruments, I prefer to employ a thermionic amplifying system in which the grid 16 of the first tube 17 is connected in circuit with the opposing coils 7 and 8. The particular form of amplifier which I prefer to use and which is shown in the drawings is described in detail and claimed in my copending application, Serial No. 433,562, filed March 6, 1930 for remote control systems.

According to my invention, all the current for the resistors, motors and amplifying unit is furnished from a common polyphase supply, no other source of current being necessary. For supplying current of the proper voltage and phase relation I have shown a pair of transformers 25 and 26, the former being used to supply plate potentials to the push-pull amplifier 18 and the latter supplying the heating current for the tubes. As shown, the filament of the first tube is heated by secondary winding 26' of the transformer 26. The output of the first tube passes through the inter-stage transformer 40 and thence to a pair of power tubes 18 arranged in push-pull fashion. These tubes have their filaments lighted from the secondary 26" of transformer 26 and alternating current of opposite potential is supplied to the plates thereof by connecting said plates to the opposite ends of the secondary 25' of the transformer 25. The grid bias for these tubes may be obtained by connecting the grids to the center tap 41 on the winding 25'.

I also employ a variable resistor 27 connected between the mid point 41 of winding 25' and the mid point 42 of the winding 26''. On account of the rectifying action of the push-pull tubes 18 acting as a full wave rectifier, an analysis will show that the current flowing through the resistor will be pulsating direct current which may be smoothed out by condensers 43 in a well known manner. I also connect to said resistor, preferably at an intermediate point 44, the mid point 45 of the winding 26'. The resistor 27 thus completes a circuit through the first tube as well as the others and by connecting the grid of the first tube to an intermediate point 46 on the resistor, the grid bias for this tube may be obtained. A feed-back coupling is thus also obtained through the resistor. Also the proper D. C. plate potential is obtained from the same resistor by an intermediate tap 47 connected through transformer 40 to the plate of the first tube. The final output of the tubes is led through the output transformer 19. This transformer has two primaries 48—49 connected respectively between the plates of the two tubes 18 and the secondary 25' of transformer 25. The secondary of said transformer has a center tap cross connected to a center tap on the primary of transformer 25 thus forming a Scott connection by which two phases are supplied to the motor 10, the third phase being supplied directly from the third phase of the supply line. The result is that two of the phases of the motor 10 will be reversed whenever the direction of movement of the coil 7 is reversed in direction thus causing the motor 10 to drive the card 14 and coil 8 in the proper direction to restore synchronism between the same and the card 13 and coil 7.

It will be understood that the proper phase relations are obtained through the proper design and adjustment of resistance, capacity and inductance in the system. My system is thus wholly operable from the polyphase supply and by it a large torque may be produced at the receiver and at the same time complete synchronism and high accuracy obtained.

Electrically speaking, it is, of course, immaterial whether the coil 7 is shifted with respect to the armature or pole pieces 1—2 or whether the rotation of the pole pieces is slightly advanced or retarded. A simple method of effecting the invention by the latter method is illustrated in Fig. 3. According to this figure, the synchronous motor 5' is rotatably mounted on the bracket 31 so that the field of the motor may be adjusted as by turning crank 32 which turns the irreversible worm 33 meshing with the wormwheel 34 secured to the field casing of the motor. Also secured to said casing is the card 13. The pole pieces 1 and 2 are secured to the shaft of the motor as before, but in this case the coil 7' may be fixed to the frame 31. It is obvious that the receiver may be similarly constructed if so desired.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a self-synchronous remote control system, a two-part transmitter comprising rotatable pole pieces, a rotatable winding adjacent said poles, means for continuously relatively rotating one of said parts, and means for turning the other of said parts to any desired position, a two-part receiver having similar poles and winding, means for relatively rotating one of said parts driven from the same supply as said first mentioned rotating means, a reversible motor for rotating the other of said parts, and an amplification circuit in circuit between said windings and motor for controlling the movements of said motor.

2. In a self-synchronous remote control system, a two-part transmitter comprising rotatable pole pieces, a rotatable winding adjacent said poles, a synchronous motor for continuously relatively rotating one of said parts, and means for turning the other of said parts to any desired position, a two-part receiver having similar poles and winding, a synchronous motor for relatively rotating one of said parts driven from the same supply as said first mentioned motor, a reversible motor for rotating the other of said parts, and a thermionic circuit in circuit between said windings and motor and powered by said supply for controlling the movements of said motor.

3. A self-synchronous remote control system as claimed in claim 2 wherein a three-phase supply is employed and a three-phase reversible motor, the latter having one phase thereof excited from said supply and two phases from the output of the thermonic unit.

4. In a self-synchronous remote control system, a continuously rotated generator-transmitter having an armature and field and producing A. C., a similar generator-receiver producing A. C. of like frequency, means for rotating the same in synchronism with the transmitter, means for displacing the normal phase relationship between the armature and field of the transmitter, a power amplifier controlled by the resultant E. M. F. produced by such phase displacement, and a reversible motor connected to the receiver and controlled from the output of the amplifier for displacing the receiver to maintain synchronism with the transmitter.

5. In a self-synchronous remote control system, a continuously rotated generator-transmitter having an armature and field and producing A. C., a similar generator-receiver producing A. C. of like frequency, synchronous motors for rotating both generators synchronously, an A. C. supply for said motors, means for displacing the normal relationship between the armature and field of the transmitter, a power amplifier controlled by the resultant E. M. F. produced by such phase displacement and powered from said supply, and a reversible motor connected to the receiver and controlled from the output of the amplifier and said supply for displacing the receiver to maintain synchronism with the transmitter.

6. In a self-synchronous remote control system, a transmitter having a rotor member comprising magnetized pole pieces and a stator member comprising rotatable windings, rotating means for providing continuous constant speed relative motion between stator and rotor, means for changing the rate of said relative motion to any desired degree or position, a receiver having a similar stator and rotor and similar means for providing the same continuous constant speed relative motion between stator and rotor driven from the same supply as said first-mentioned means, a reversible motor for changing the rate of said relative motion, and an amplifier controlled by the differential output of the windings of the transmitter and receiver for operating said motor.

In testimony whereof I have affixed my signature.

BRUNO A. WITTKUHNS.